W. PATERSON.
APPARATUS FOR MEASURING AND RECORDING THE QUANTITY OF FLOW OF LIQUIDS.
APPLICATION FILED MAR. 18, 1913.

1,239,300.

Patented Sept. 4, 1917.
5 SHEETS—SHEET 4.

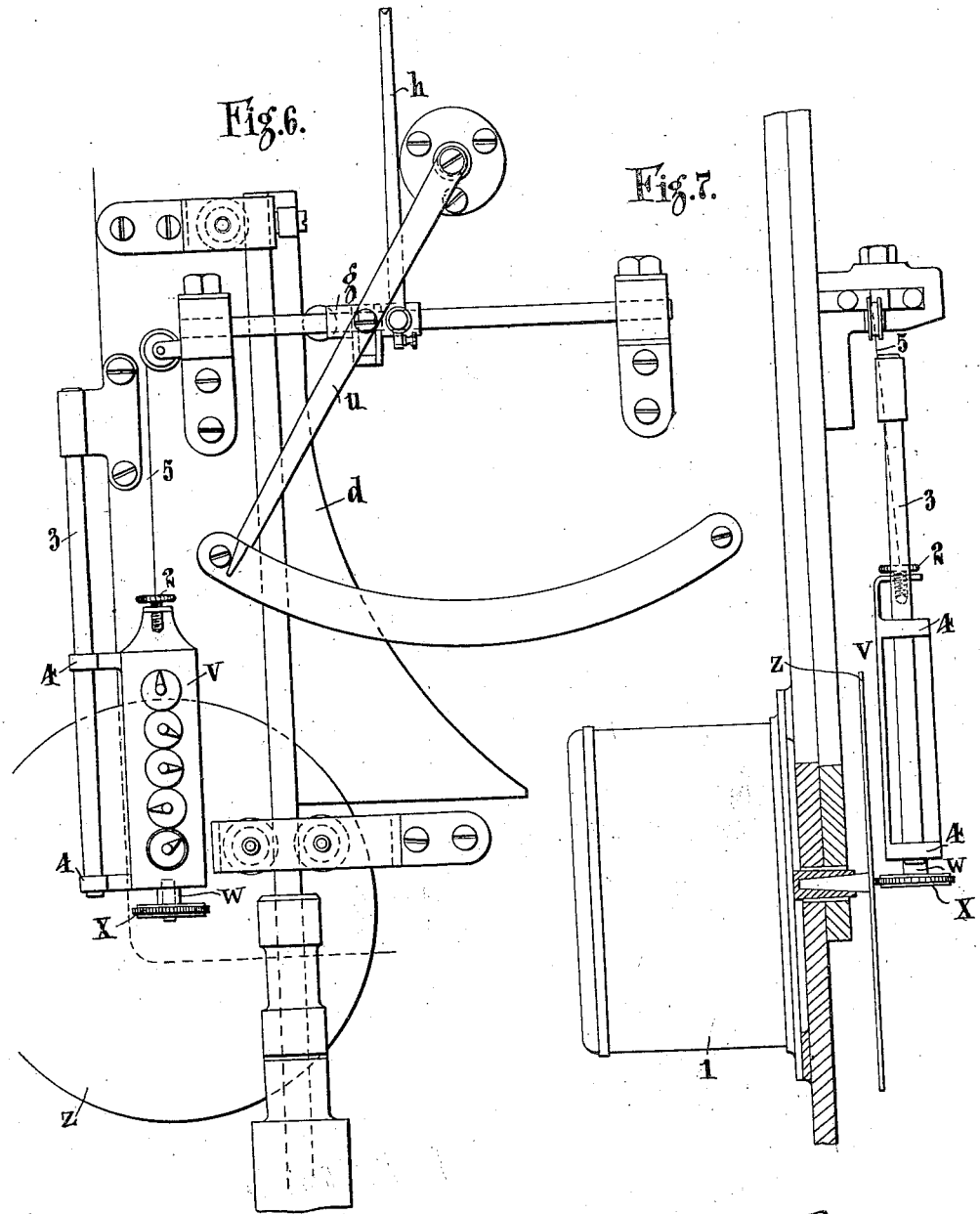

UNITED STATES PATENT OFFICE.

WILLIAM PATERSON, OF LONDON, ENGLAND.

APPARATUS FOR MEASURING AND RECORDING THE QUANTITY OF FLOW OF LIQUIDS.

1,239,300.

Specification of Letters Patent. Patented Sept. 4, 1917.

Application filed March 18, 1913. Serial No. 755,066.

*To all whom it may concern:*

Be it known that I, WILLIAM PATERSON, a subject of the King of Great Britain and Ireland, and residing at Amberley House, Norfolk street, Strand, London, W. C., England, have invented certain new and useful Improved Apparatus for Measuring and Recording the Quantity of Flow of Liquids, of which the following is a specification.

This invention relates to improvements in apparatus for measuring and recording the quantity of a flow of liquid of the type in which the liquid is passed over a weir or through an orifice and the measuring and recording instruments operated by means of a float which is subject to variations in the level of the liquid above the weir or orifice.

These instruments are based upon the well-known fact that the quantity of liquid flowing over a weir or through an orifice at any particular time is a function of the head of liquid above the lip of the weir or above the orifice at that time, but that except in the case of very special orifices which introduce serious errors when put into practical use the quantity never varies proportionately to the head of liquid.

Such apparatus usually consists of a cam surface wound in a helical manner upon a drum or disk, the curved surface of the cam being shaped to suit the curve giving the relation between the quantity of liquid passing and the head of liquid above the weir and engaging a marker or the like by means of which a diagram giving a record of the quantity of flow of liquid may be obtained.

The frictional resistance of such apparatus due to the number of working parts therein is such that errors in the reading of the instrument are certain to be introduced.

The object of the present invention is to provide a simple and efficient form of apparatus in which the above disadvantages are obviated and the invention consists in an apparatus comprising a cam adapted to be moved directly in a longitudinal direction by the float with which the apparatus is also provided and to actuate a marker, pointer or the like whereby a reading upon a scale or a permanent record upon a chart may be obtained showing the amount of liquid passing.

The invention also consists in the provision of multiplying gear of any suitable form for the purpose of increasing the size of the chart given by the marker when desired.

The invention also comprises other details hereinafter more particularly referred to.

The accompanying drawings illustrate two modes of carrying out the invention.

Fig. 5 is a sectional elevation on a somewhat small scale illustrating a detail hereinafter referred to.

Figs. 6 and 7 are two views illustrating a modified form of device according to the invention.

Figure 5:
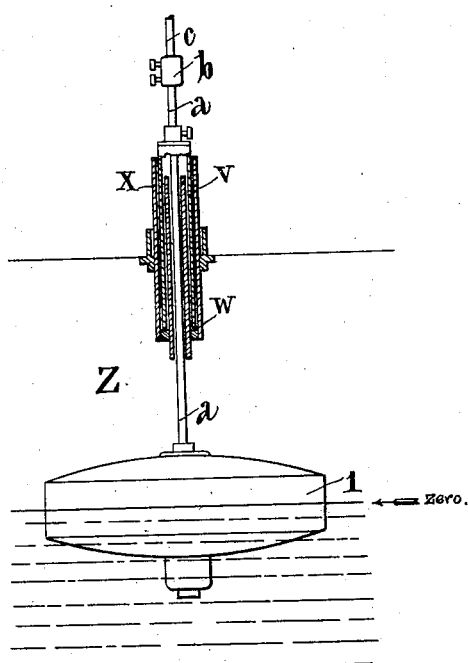

In carrying my invention into effect in one convenient manner when constructing apparatus for measuring the flow of water over a weir I provide a float chamber Z (Fig. 5) in communication in any usual manner with the weir so that the variation in the position of the float 1 is a measure of the variation of the head of liquid above the weir. The float rod $a$ in the example shown is connected by any suitable form of coupling $b$ to a rod $c$ which carries in any suitable manner a flattened cam $d$, and in order that the float may be capable of moving freely without permitting the escape of fumes or vapors with the recording gear hereinafter described I prefer to provide any suitable form of liquid seal or the like in connection with the float rod, one such device being illustrated in Fig. 5 and comprising a tube V closed at its upper end and carried by the float rod and adapted to dip into an annular vessel W containing water or other convenient liquid. Any fumes or vapors passing up the tube X within which the float rod is located will be trapped between the tube V and the liquid in the container W so that the float rod is permitted to rise and fall freely without allowing the escape of the fumes or vapors. The cam rod $e$ is guided by grooved pulleys $e$ mounted in suitable brackets $f$, the outer ends of which are provided with slots through which the flattened cam $d$ can pass while the brackets also have the effect of preventing rotation of the cam rod $c$. The cam $d$ is provided with a curved surface shaped to suit the curve giving the relation between the quantity of liquid passing and the head of liquid above the weir and adapted to bear against a carriage $g$ upon which is mounted a suitable pen or marker $h$ for giving a chart upon the drum $i$ in the usual manner.

The carriage is preferably provided with a hardened steel or other suitable anti-friction roller $k$ which is made to bear constantly against the cam surface by means of a spring or a counterweight $l$ or other suitable device. The marker carriage $g$ may be mounted in any suitable manner as far example upon a pair of guides or rods $m$ of silver steel or other suitable material, or the carriage may be provided with rollers or like anti-friction devices engaging suitable slides or guides.

Figure 1:
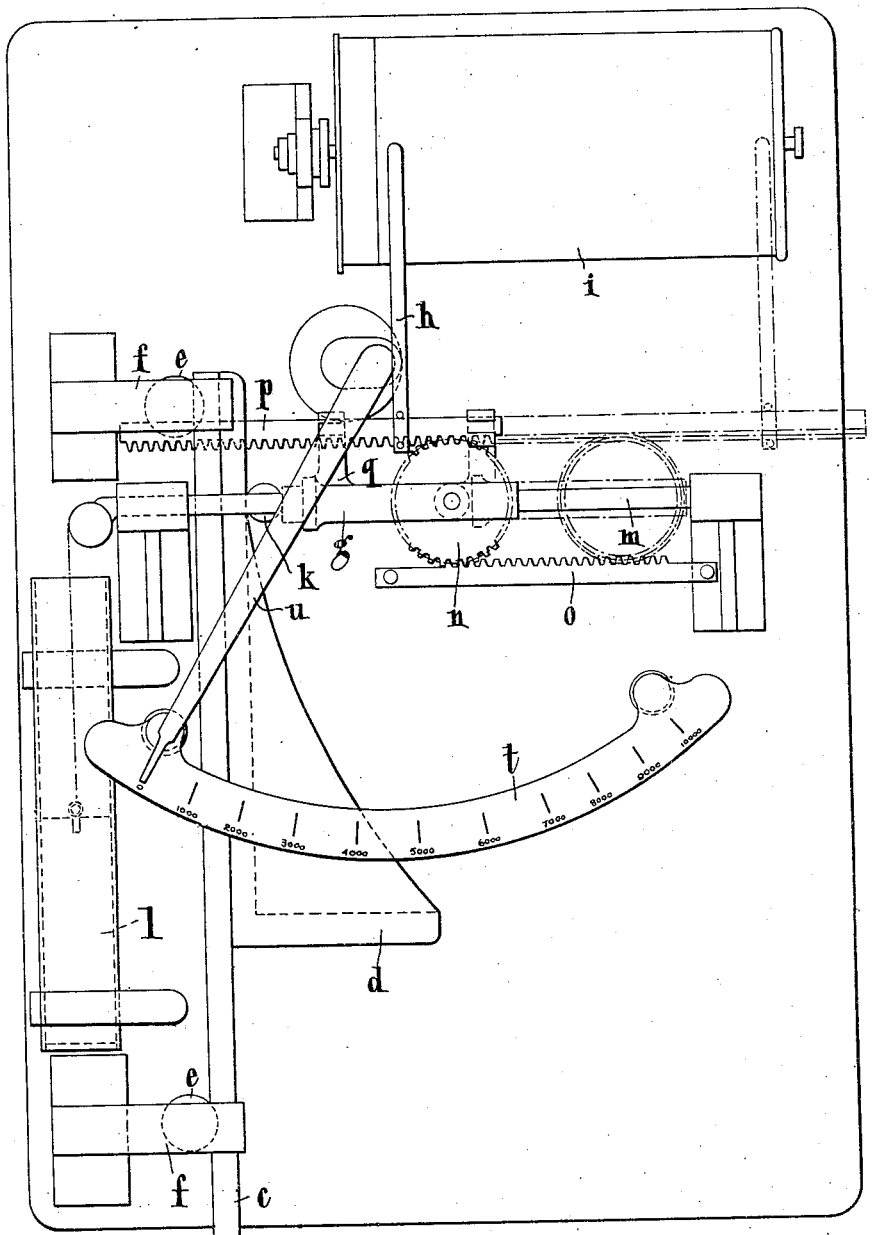
Figures 1 and 2 are respectively a front elevation and a side elevation showing one convenient form of apparatus constructed in accordance with the invention.
Figure 2:
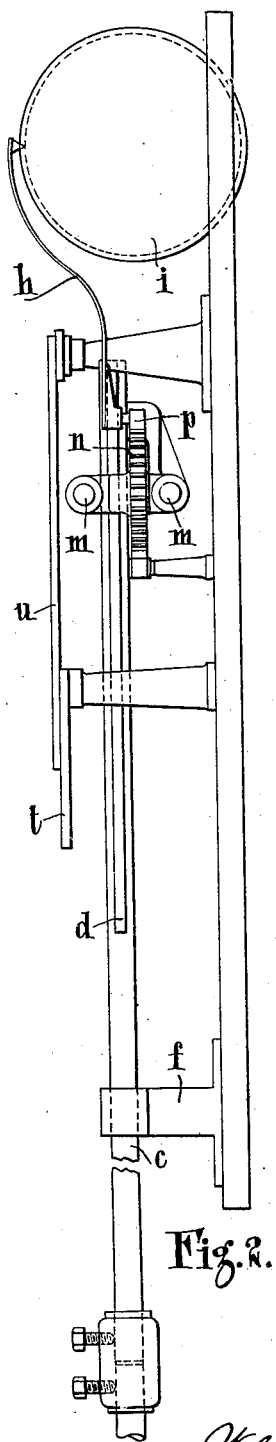

In the device illustrated in Figs. 1 and 2 multiplying gear is introduced for the purpose of increasing the size of chart given by the marker or pointer $h$ and in one convenient construction the carriage $g$ has mounted thereon an idle pinion $n$ adapted to engage with both a fixed rack $o$ and a movable rack $p$, the latter carrying the pointer or marker $h$ and being conveniently guided by rollers or other anti-friction means on extensions $r$ of the carriage $g$ and a similar extension on the back of the fixed bracket $f$.

It will be clear that when the float rod $a$ with its attached cam rod $c$ is in the zero position the pull of the balance weight $l$ will bring the sliding carriage $g$ into such position that its rollers $k$ bear against the face of the cam while the marker $h$ will be in its zero position in relation to the drum or chart $i$. As the float rises the carriage $g$ and with it the pen $h$ is moved into a position bearing a direct ratio to the quantity of liquid passing over the weir or through the orifice in connection with which the indicating apparatus is employed, and in the form illustrated in Fig. 1 it will be clear that the movement of the marker $h$ is double that of the sliding carriage $g$ so that a larger chart is thereby obtained.

Figure 3:
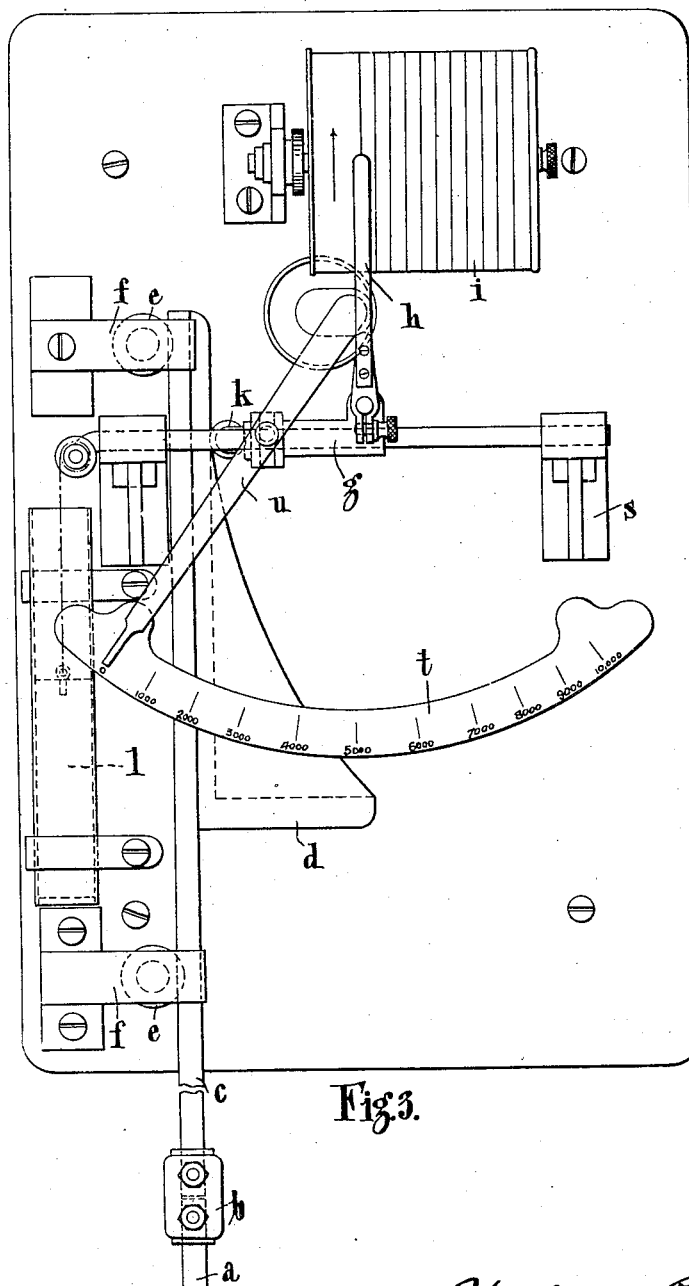
Figs. 3 and 4 are similar views illustrating a modified form of apparatus while Figure 4:
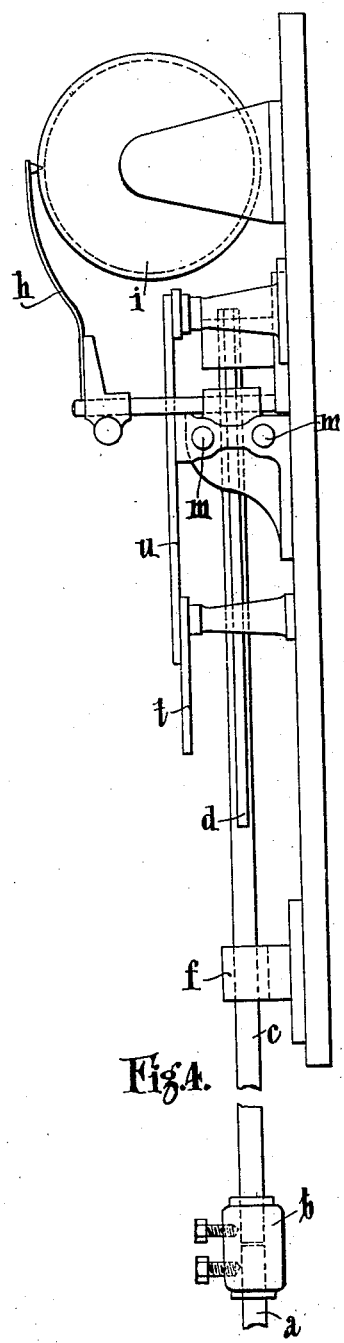

Figs. 3 and 4 illustrate a similar form of apparatus to that hereinbefore described in which the multiplying gear is omitted, the movement of the marker in this case being equal to that of the sliding carriage $g$.

In the modification illustrated in Figs. 6 and 7 the counter-weight for maintaining contact between the carriage $g$ and the cam $d$ takes the form of a meter or registering mechanism $V'$ of any suitable form and construction, the weight of which is so proportioned that it may be used interchangeably with an ordinary counter-weight, when it is not desired that the mechanism shall be fitted with a meter.

The actuating spindle $W'$ of the registering mechanism carries a small friction wheel or disk $X'$ preferably made as light as possible and of any suitable material and adapted to engage a disk $Z'$ of suitable size and formed from any convenient metal or material and adapted to be rotated at a constant speed preferably by means of suitable clockwork mechanism 1 (Fig. 7).

The meter $V'$ is provided with any suitable form of adjustable suspension such as a milled-headed screw 2 so that its position may be regulated in such a manner that when the marker $h$ and pointer $u$ are in the zero position the disk or wheel $X'$ is arranged centrally with respect to the disk $Z'$, so that any movement is imparted by the latter to the registering mechanism.

The meter may be guided in any suitable manner as for example by means of the fixed guide 3 engaging with lugs 4 upon the meter, and in order to insure the necessary contact between the disks $x$ and $z$ I may, if desired, suspend the meter in such a manner that the cord or the like 5 is slightly out of the vertical, so that the weight of the registering mechanism is brought into play to exert the necessary contact.

It will be readily understood that as the carriage $g$ is moved away from its zero position under the influence of the cam $d$ the meter will be gradually raised in such a manner that the distance at any particular time of the disk $x$ from the center of the disk $z$ and therefore the number of revolutions imparted to the registering mechanism in unit time, will be a measure of the quantity of liquid passing through the apparatus at that time, so that the meter will give the total quantiy of liquid which has passed through the apparatus in any given period of time.

In any construction I may, if desired, provide a graduated scale $t$ in conjunction with a pointer $u$ to indicate at any moment the quantity of liquid passing, the pointer being provided with a pin engaging a slotted or other collar upon the sliding carriage or being linked to the sliding carriage.

I do not confine my invention to its application hereinbefore given by way of example nor to the details of construction described as these may be variously modified to suit varying requirements and I may employ my invention with equal effect and like advantage when indicating and recording other measurements wherein a like compensating effect is to be obtained due to the fact that the curve upon which the measurements are based is not a straight line curve.

Having now described my invention, what I claim as new and desire to secure by Letters Patent is:—

1. In an apparatus of the character described the combination of a float subject to variations in the level of liquid passing over a weir or through an orifice, a recording cylinder, a marker in contact therewith, a cam for actuating said marker rigidly secured to and movable longitudinally with said float and having a surface of such form that the movement of the marker is directly proportional to the volume of liquid passing, a slidable carriage in contact with said cam, an idle pinion mounted upon said carriage, a fixed rack in engagement with said pinion and an oppositely disposed movable rack also in engagement with said pinion and carrying said marker.

2. In an apparatus of the character described the combination of a float subject to variations in the level of liquid passing over a weir or through an orifice, a slidable carriage, recording mechanism carried by said carriage, a cam in contact with said carriage rigidly secured to and movable longitudinally with said float and of such a contour that the movement of said carriage is directly proportional to the volume of liquid passing and a counter-weight for maintaining contact between said carriage and said cam.

3. In an apparatus of the character described the combination of a float subject to variations in the level of liquid passing over a weir or through an orifice, a slidable carriage, a recorder carried thereby, a cam in contact with said carriage rigidly secured to and movable longitudinally with said float and of such a form that the movement of the carriage is directly proportional to the volume of liquid passing, and a counter-weight for maintaining contact between said carriage and said cam comprising registering mechanism for indicating the total amount of liquid passing through the apparatus.

4. In an apparatus of the character described the combination of a float subject to variations in the level of liquid passing over a weir or through an orifice, a slidable carriage upon which is mounted a recording marker, a cam in contact with said carriage rigidly secured to and movable longitudinally with said float and of such a form that the movement of the carriage is directly proportional to the volume of liquid passing, and means for maintaining contact between the carriage and the cam, said means comprising registering mechanism connected with said carriage, a disk mounted upon the shaft of said registering mechanism and a second disk in engagement with the first disk, and means for rotating said second disk at a uniform speed.

In testimony whereof I have signed my name to this specification in the presence of two subscribing witnesses.

WILLIAM PATERSON.

Witnesses:
WILFRED L. PARTINGTON,
ERNEST WM. PRATT.

Copies of this patent may be obtained for five cents each, by addressing the "Commissioner of Patents, Washington, D. C."